United States Patent
Armington

(10) Patent No.: US 7,769,720 B2
(45) Date of Patent: Aug. 3, 2010

(54) SYSTEMS AND METHODS FOR MIGRATING A SERVER FROM ONE PHYSICAL PLATFORM TO A DIFFERENT PHYSICAL PLATFORM

(75) Inventor: John P. Armington, Marietta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 541 days.

(21) Appl. No.: 10/869,730

(22) Filed: Jun. 16, 2004

(65) Prior Publication Data

US 2006/0010176 A1    Jan. 12, 2006

(51) Int. Cl.
G06F 17/30    (2006.01)
(52) U.S. Cl. ..................................... 707/654
(58) Field of Classification Search ................ 707/200, 707/203, 204
See application file for complete search history.

(56) References Cited

U.S. PATENT DOCUMENTS

| | | | |
|---|---|---|---|
| 5,758,345 A * | 5/1998 | Wang | 707/100 |
| 6,477,624 B1 * | 11/2002 | Kedem et al. | 711/147 |
| 6,880,002 B2 * | 4/2005 | Hirschfeld et al. | 709/223 |
| 6,938,045 B2 * | 8/2005 | Li et al. | 707/100 |
| 2004/0107273 A1 * | 6/2004 | Biran et al. | 709/223 |
| 2004/0172574 A1 * | 9/2004 | Wing et al. | 714/4 |
| 2004/0243650 A1 * | 12/2004 | McCrory et al. | 707/203 |
| 2008/0222376 A1 * | 9/2008 | Burton et al. | 711/162 |

OTHER PUBLICATIONS

Sapuntzakis, Constantine, et al., "Virtual Appliances for Deploying and Maintaining Software," Oct. 2003, In the Proceedings of the 17th Large Installation System Administration Conference ('03), pp. 181-194.*

* cited by examiner

Primary Examiner—Neveen Abel Jalil
Assistant Examiner—Farhan M Syed

(57) ABSTRACT

In one embodiment, a system and a method for migrating a server from one physical platform to a different physical platform pertain to converting a first server for use on a first physical platform into a virtual server and converting the virtual server into a second server for use on a second physical platform, the second physical platform being different than the first physical platform such that the conversions effectively migrate the first server from the first physical platform to the second physical platform.

11 Claims, 6 Drawing Sheets

SYSTEMS AND METHODS FOR MIGRATING A SERVER FROM ONE PHYSICAL PLATFORM TO A DIFFERENT PHYSICAL PLATFORM

BACKGROUND

Data centers are centralized facilities that are commonly used to manage data for various types of organizations, including large-scale enterprises. Such data centers typically comprise several server computers that manage network resources. For example, a data center may comprise one or more of a web server, a network server, a file server, and a print server, each comprising a separate physical machine.

On occasion, it may be desirable to migrate a server application (and therefore the server functionality) from one hardware platform to another. For instance, the server application may out-grow its existing hardware platform and may require a larger and/or faster platform to produce optimal results. To cite another example, the server's hardware platform may simply become obsolete in view of hardware advancements in the computer industry. In other cases, the server application may be being downsized and no longer requires the large hardware platform on which it currently operates (in which case the hardware is being underutilized).

Although it is possible to manually transfer a server application from one hardware platform to another, such transfer has typically been achieved by rebuilding the server application from scratch on the new hardware platform. Such rebuilding is highly complex, may require days or weeks of intensive work, and is susceptible to error. In addition, an extended rebuilding process can mean several days of server downtime and, therefore, reduced productivity and/or revenues. Moreover, even though such a transfer may be successfully accomplished, it is not repeatable. In other words, a different rebuilding process must be used to transfer between each new hardware platform pair (source and target).

Due to the difficulty of rebuilding servers in the manner described above, data centers often opt to postpone transfer of a server from one physical platform to another, sometimes indefinitely. Associated with such delay are several undesirable results including, for example, unnecessary expenditures on hardware, under utilization of existing hardware resources, and performance degradation.

SUMMARY

In one embodiment, a system and a method pertain to converting a first server for use on a first physical platform into a virtual server and converting the virtual server into a second server for use on a second physical platform, the second physical platform being different than the first physical platform such that the conversions effectively migrate the first server from the first physical platform to the second physical platform.

BRIEF DESCRIPTION OF THE DRAWINGS

The disclosed systems and methods can be better understood with reference to the following drawings. The components in the drawings are not necessarily to scale.

DETAILED DESCRIPTION

Disclosed are systems and methods for migrating a server application, or simply "server," from one physical (i.e., hardware) platform to a different physical platform. As is described in greater detail below, such migration can be achieved by developing scripts that transform the server image on a physical platform to a virtual server image, and scripts that re-transform the virtual server image back to a server image for the physical platform. In some embodiments, such a process can leverage existing physical-to-virtual (P2V) migration tools to, at least partially, automate the migration from a first physical platform to a second physical platform.

In the present disclosure, the following terms and definitions are used:

"Server application": a software application or collection of applications that provides a server functionality;

"Physical platform": the underlying hardware on which a server application can execute and for which the server application is developed;

"Physical server": the server application installed and executable on a given physical platform;

"Physical server image": the collection of files and directories that together define the server application as configured for execution on a given physical platform;

"Virtual platform": a virtual environment in which a server application can execute that emulates a physical environment;

"Virtual server": the server application "installed" and executable on a given virtual platform; and "Virtual server image": the collection of files and directories that together define the server application as configured for execution on a given virtual platform.

Figure 1:
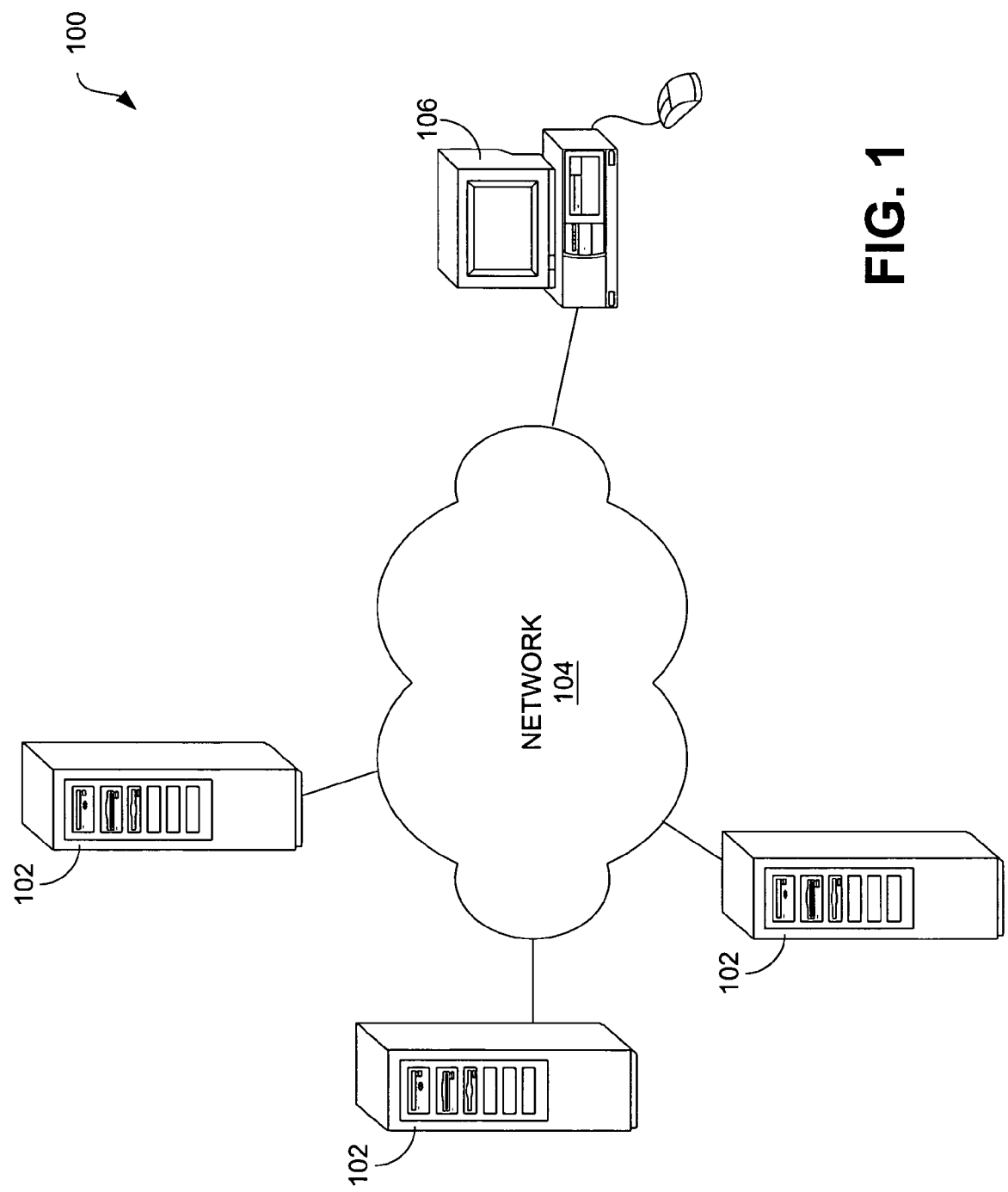
FIG. 1 is a schematic view of an embodiment of a system in which a server can be migrated from one physical platform to a different physical platform.

Referring now in more detail to the figures in which like numerals identify corresponding parts, FIG. 1 illustrates an example system 100 in which a server can be migrated from one physical platform to another. As is indicated in FIG. 1, the system 100 generally comprises computers 102 that may be used as separate server computers (i.e., as dedicated server machines) or as hosts for one or more virtual servers. By way of example, at least one of the computers 102 executes a server application that is to be migrated to one of the other computers 102 in the system 100 that has a different hardware platform. By way of example, the different platforms comprise different processors, buses, drivers, peripherals, etc.

Each computer 102 is connected to a network 104. In some cases, the network 104 comprises a local area network (LAN), for instance a LAN used within an enterprise data center. In other cases, however, the network 104 may comprise a wide area network (WAN) and/or a series of sub-networks (LANs and/or WANs) that are linked together to form an aggregate network.

Also connected to the network 104 is an administration computer 106 that, for example, is operated by a system administrator who is responsible for managing the system 100 and, therefore, for performing migration of a server from one physical platform to a different physical platform. Although depicted in FIG. 1 as having a different configuration from the computers 102, the administration computer 106 may have a configuration that is the same or similar to one or more of the other computers of the system 100.

Figure 2:
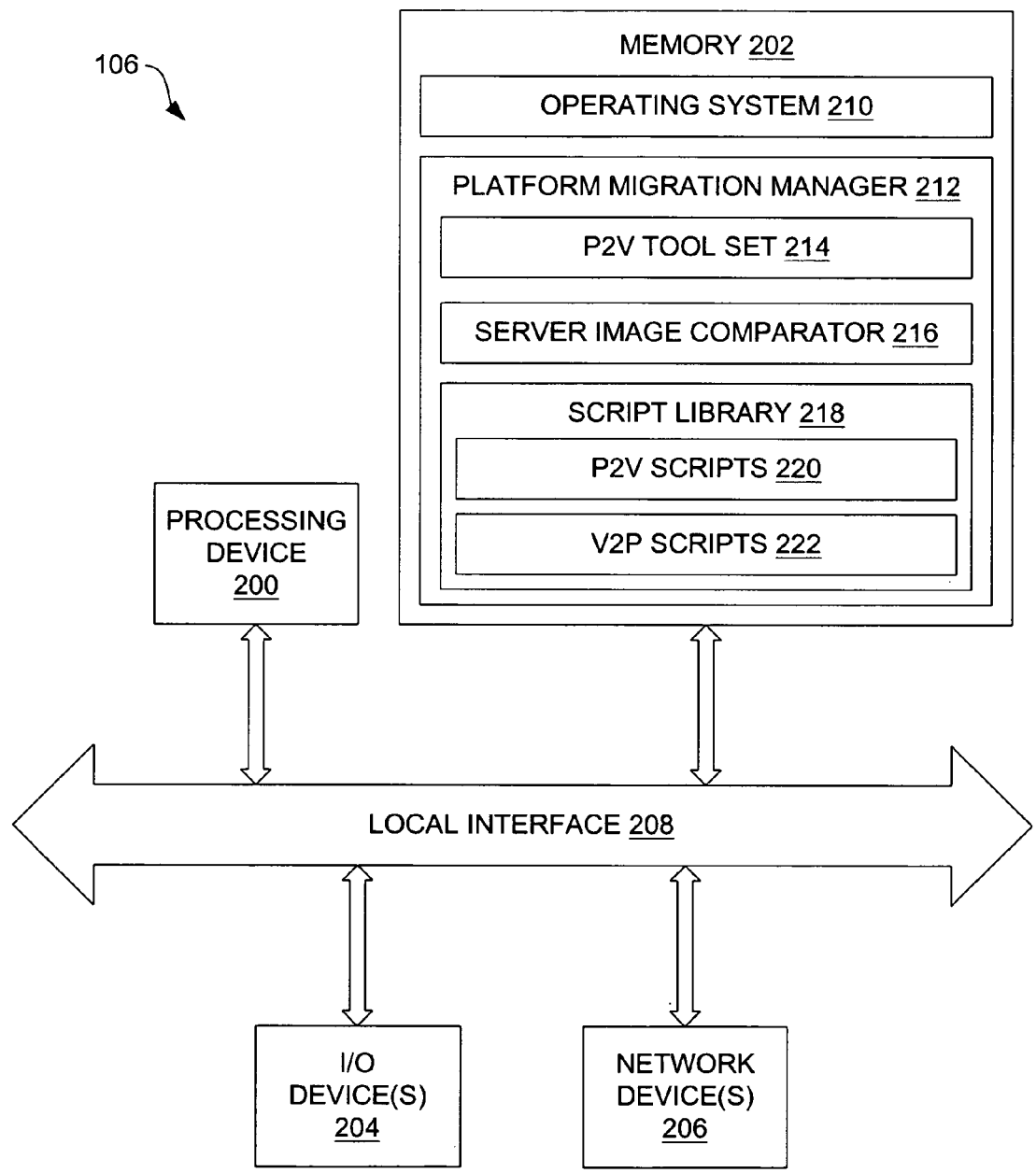
FIG. 2 is a block diagram of an embodiment of an administration computer shown in FIG. 1.

FIG. 2 is a block diagram illustrating an example architecture for the administration computer 106 shown in FIG. 1. As is indicated in FIG. 2, the administration computer 106 generally comprises a processing device 200, memory 202, one or more input/output (I/O) devices 204, and one or more network devices 206, each of which is connected to a local interface 208.

The processing device 200 can include any commercially-available or custom-made processor, a central processing unit (CPU), an auxiliary processor among several processors associated with the administration computer 112, or a semiconductor-based microprocessor (in the form of a microchip). The memory 202 can include any one or a combination of volatile memory elements (e.g., random access memory (RAM)) and nonvolatile memory elements (e.g., hard disk, compact disc (CD), magnetic tape, etc.).

The I/O devices 204 comprise those components with which a user (e.g., system administrator) can interact with the administration computer 106, such as a keyboard, a mouse, and a monitor, as well as the components that are used to facilitate connection of the administration computer to other devices (e.g., serial, parallel, small computer system interface (SCSI), or universal serial bus (USB) connection ports). The network devices 206 comprise the components used to transmit and/or receive data over a network (e.g., network 104, FIG. 1) such as, for example, a network card, modem, or radio frequency (RF) transceiver.

The memory 202 comprises various programs, typically in software, including an operating system (O/S) 210 and a platform migration manager 212 that executes on top of the O/S. The O/S 210 controls the execution of other programs and provides scheduling, input-output control, file and data management, memory management, and communication control and related services. The platform migration manager 212 is responsible for transferring (or migrating) a server from a first physical platform (e.g., of a first computer 102) to a second physical platform (e.g., of a second computer 102) so that the same server functionality can be provided using different hardware.

As is shown in FIG. 2, the platform migration manager 212 comprises, at least in the illustrated embodiment, a physical-to-virtual (P2V) tool set 214, a server image comparator 216, and a script library 218. As is described in greater detail below, the P2V tool set 214 comprises one or more P2V migration tools that are used to migrate a server (i.e., server image) from a physical (i.e., hardware) platform to a virtual platform. In other words, the P2V tools convert physical servers into virtual servers. Example P2V migration tools include the P2V Assistant from VMware, Inc. of Palo Alto, Calif.; the Operations Management Center P2V from Platespin of Toronto, Ontario; and the Virtual Machine Controller from Leostream of Burlington, Mass.

As is further described below, the server image comparator 216 comprises a program that compares the respective server images of physical servers and virtual servers (created using a P2V migration tool) for purposes of creating scripts that comprise the commands required to convert source images for use on physical platforms to target images use on virtual platforms, and vice versa.

Finally, the script library 218 comprises a database in which scripts created by the comparator 216 are stored for a variety of physical/virtual platform combinations. With those scripts, a virtual server that results from a P2V migration can be converted to back to a physical server. Accordingly, a server (i.e., server image) used on a first physical platform can be transformed using the scripts into a server (i.e., server image) for use on a second physical platform using the virtual platform as a reference. As is apparent from FIG. 2, the stored scripts may be described as P2V scripts 220, which convert physical servers into virtual servers, and V2P scripts 222, which convert virtual servers into physical servers.

Various programs (i.e., logic) have been described above. Those programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

An example system having been described above, examples of migrating a server from one physical platform to a different physical platform will now be described. In the discussions that follow, flow diagrams are provided. Any process steps or blocks in these flow diagrams may represent modules, segments, or portions of code that include one or more executable instructions for implementing specific logical functions or steps in the process. Although particular example process steps are described, alternative implementations are feasible. For instance, some steps may be executed out of order from that shown and discussed depending on the functionality involved.

Figure 3:
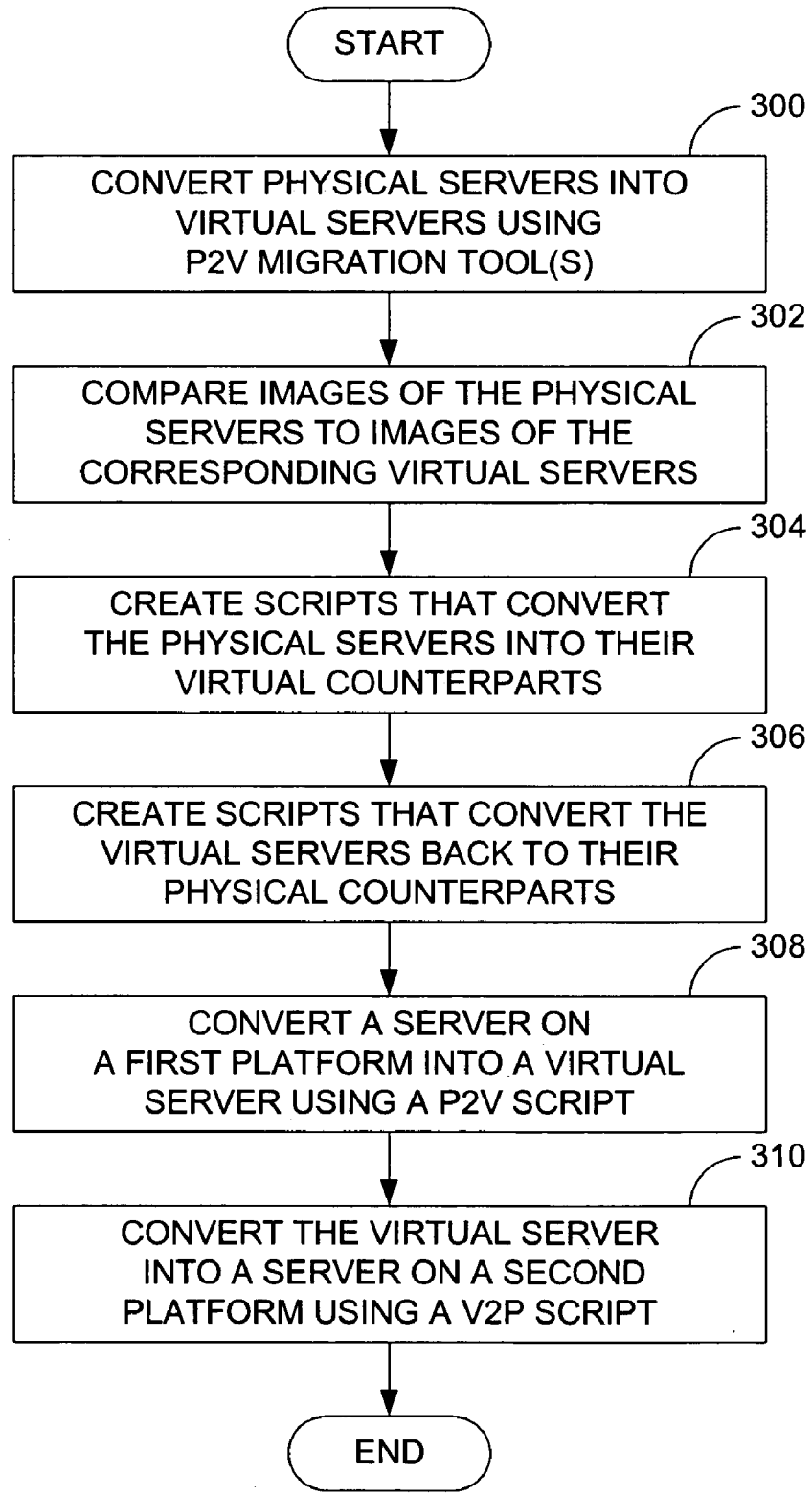
FIG. 3 is a flow diagram that illustrates an embodiment of migrating a server from one physical platform to a different physical platform.

FIG. 3 provides an overview of an example of server migration. More particularly, FIG. 3 describes a method through which server applications on first hardware platforms (e.g., of first computers) can be transferred to second hardware platforms (e.g., of second computers).

Beginning with block 300, physical servers are converted into virtual servers using one or more P2V migration tools, such as those described in the foregoing. Through that process, a group of virtual servers that correspond to counterpart physical servers are created. As is described below, the creation of multiple virtual servers enables the creation of a catalog of scripts that may be used to convert multiple servers on different physical platforms to virtual servers.

Once the physical servers have been converted into virtual servers, the images of the physical servers are compared to the images of the corresponding virtual servers (i.e., virtual servers that emulate the physical servers), as indicated in block 302. In other words, the entire structures, including all routines, modules, and files, of corresponding servers are compared. Through that comparison, the differences between the physical servers and their virtual counterparts can be identified. Those differences reflect changes resulting from the conversion process that can be replicated by a script that comprises the various commands required to effect those changes. Accordingly, referring to block 304, scripts are created that convert the physical servers into their virtual counterparts. For instance, a first script can be created for converting a server image on physical platform A into a server image for virtual platform A (i.e., a virtual server), a second script can be created for converting a server image on physical platform B into a server image for virtual platform A, and so forth. Through that process, several conversion scripts may be generated, and those scripts may be, for example, stored in a script library (e.g., library 218, FIG. 2). The scripts may be designated P2V scripts given that they convert servers (i.e., server images) from s physical to virtual platforms.

Referring next to block 306, scripts are created that convert the virtual servers back to their physical counterparts. In other words, scripts are created that perform the inverse function of the P2V scripts described above. These new scripts may be designated V2P scripts given that they convert servers (i.e., server images) from virtual to physical platforms. By way of example, a first V2P script can be created for converting a server image for virtual platform A into a server image for physical platform A, a second script can be created for converting a server image for virtual platform A into a server image for physical platform B, etc. Those scripts can likewise be stored in a library, if desired, for later use.

At this point, conversion scripts have been generated for transforming servers from physical-to-virtual (P2V) and from virtual-to-physical (V2P) platforms. With such scripts, a given physical server can be transformed into a virtual server and back again to a physical server. As is described in the following, such capability further enables transformation of a server on a first physical platform into a server for a different physical platform.

Continuing on to block 308, a server on a first physical platform is converted to a virtual server using an appropriate P2V script. Specifically, a P2V script that was created for converting servers on that particular physical platform is selected from the available scripts (e.g., contained within the library), and is used to perform the conversion. For example, a server on physical platform A is converted into a virtual server for virtual platform A.

Next, the virtual server is converted into a server for a second physical platform using an appropriate V2P script, as indicated in block 310. For this conversion, a V2P script is selected that is configured to convert virtual server images to server images for a physical platform that is different from the physical platform on which the original server (source server) operated. In keeping with the previous example, the virtual server that was created from the physical server using physical platform A is converted into a physical server for use on physical platform B, thereby effecting a migration of a server from physical platform A to physical platform B without the need to rebuild a new physical server from scratch.

Figure 4:
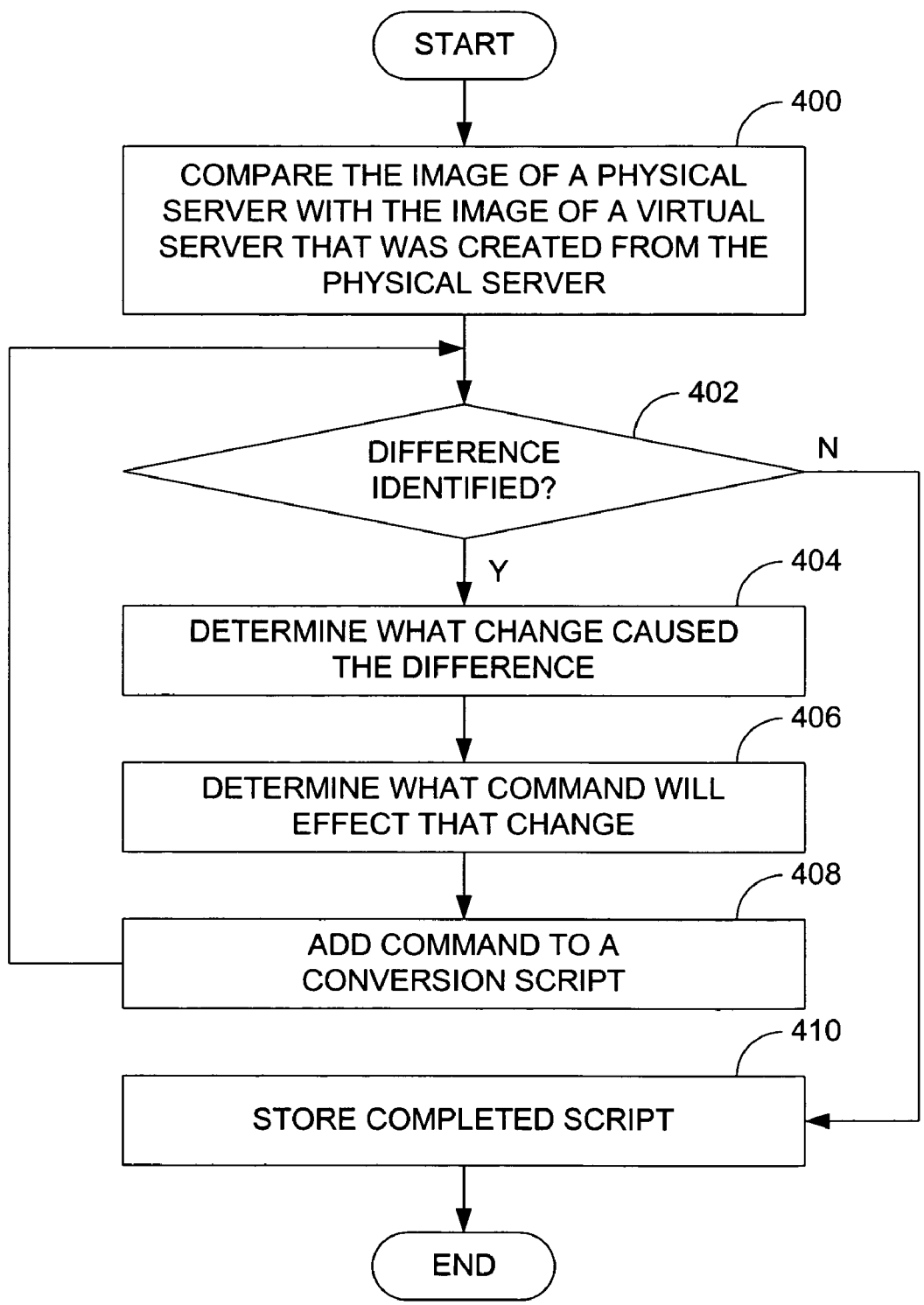
FIG. 4 is a flow diagram that illustrates an embodiment of generating scripts used to facilitate server migration.

FIG. 4 describes the script-creation process in greater detail. In particular, FIG. 4 describes an example of operation of the server image comparator 216 in comparing an image of a server on a given platform with an image of a virtual server created using a P2V tool, and then creating a script that converts physical servers on the given platform to virtual servers. The flow described in FIG. 4 presupposes the earlier creation of a virtual server using a P2V migration tool. The migration process can be viewed as capturing an existing physical server and moving it to a virtual machine such that the same functionality provided by the physical system (i.e., server) is provided within a virtual environment. The P2V migration tool takes a "snapshot" of the existing physical server and transforms it into a virtual machine that behaves in the same manner as the physical server. Therefore, an image of the physical server can be redeployed in a consolidated "sandbox" environment of the virtual platform.

The virtual server can then be operated on substantially any desired computer (either the same or a different machine) in a manner in which server clients cannot detect a difference from the physical server. To enable such functionality, the virtual server is created so as to retain the identity and settings of the physical server including, for example, the machine name, hard disks (partitions), data files, applications, and data settings. Retention of that identity and those settings is achieved by copying all files resident on a physical source disk and storing them to a virtual disk file, or target disk. The target disk may not comprise a bootable disk until the disk is reconfigured by the P2V migration tool and designated as the system partition in the virtual machine. Such a system reconfiguration process configures selected drivers so that the operating system can boot a virtual machine. What results is a virtual server that contains an exact copy of the disk state from the source server with the exception of some hardware-dependent drivers. Therefore, settings that remain identical include operating system configuration (computer name, security identification, user accounts, profiles and preferences, and so forth); the number of disks, partition layout, and drive letters; applications and data files; and each disk partition's volume serial number.

As is described in the foregoing, it may be desirable to generate several virtual servers, one for each of several different physical servers. In such a case, scripts can be created to automate migration from each of the server physical platforms to the virtual platform, and then back to any one of the physical platforms (including a physical platform different from the source platform).

Referring now to block 400 of FIG. 4, the server image comparator 216 compares the image of a physical server with the image of a virtual server that was created from the physical server, for instance using a P2V migration tool such as those described above. The image of the physical server can comprise the same image that was used in the P2V migration. Therefore, that image may comprise a copy of the source machine state that identifies the configuration and settings of the physical server in explicit detail. The virtual server image likewise comprises a copy of the virtual machine state and identifies the configuration and settings of the virtual server.

The image comparison can be performed in various ways. For example, the comparator 216 can be configured to operate in similar manner to a system management program, such as the Operations Manager from BladeLogic of Waltham, Mass. which is configured to compare server images to a standard server image for the purpose of ensuring compliance with the defined standard. In other cases, the comparator 216 can be configured to operate in similar manner to a server backup program that is configured to compare a present state of a server image with a previous state of a server image to identify changes that should be recorded for backup purposes.

Irrespective of the manner in which the comparison is made, the comparator 216 identifies any differences between the two images, as indicated in decision block 402. In other words, the comparator 216 evaluates the images section-by-section to identify each difference between the two. Assuming that a difference is detected, flow continues to block 404 at which the comparator 216 determines what change caused the difference. Specifically, the comparator 216 determines what transformation or conversion occurred during the migration process that resulted in the observed change in a feature of the physical server image. From those changes, the comparator 216 can create a script that defines how to convert a physical server to a virtual server (or vice versa, see below). Accordingly, as indicated in block 406, the comparator 216 adds a command to a conversion script that is configured to effect the change that resulted in the observed difference (block 402).

The changes that occurred and the script commands for effecting those changes can be determined in various ways. For instance, the comparator 216 can make those determinations in similar manner to the way in which the BladeLogic Operations Manager creates scripts that force compliance with a standard image. Given that the migration process used to migrate a physical server to a virtual platform only makes the minimum number of changes to the server image to enable operation of the server within the virtual environment, the commands created for the script are generic to the physical platform. In other words, once the script is completed, it can be used to convert other servers using the same physical platform and operating system, so as to provide a repeatable process.

At this point, flow returns to decision block 402 for the next identified difference. Flow repeats in the manner described above until no further differences are detected. At that point, flow continues to block 408 at which the comparator 216 stores the completed script in an appropriate location (e.g., script library 218) as indicated in block 410.

Once the above-described process has been completed, i.e., once a P2V script has been created for a given physical platform (and operating system), the script creation procedure can be reversed so as to obtain a V2P script for that same physical platform. Specifically, the physical server image is compared to the virtual server image to determine what changes must occur to transform the virtual server image back to the physical server image. Such a process is the inverse of that described in relation to FIG. 4 and therefore will not be described explicitly herein.

Through the processes described above, a P2V script and a V2P script is developed for a given physical platform (and a given virtual platform as well). Those processes may be repeated for a variety of physical platforms so as to obtain a catalog of scripts that may be used for physical-to-physical (P2P) migration of server applications. Such a catalog will comprise two scripts for each physical platform, i.e., one P2V script and on V2P script.

Figure 5:
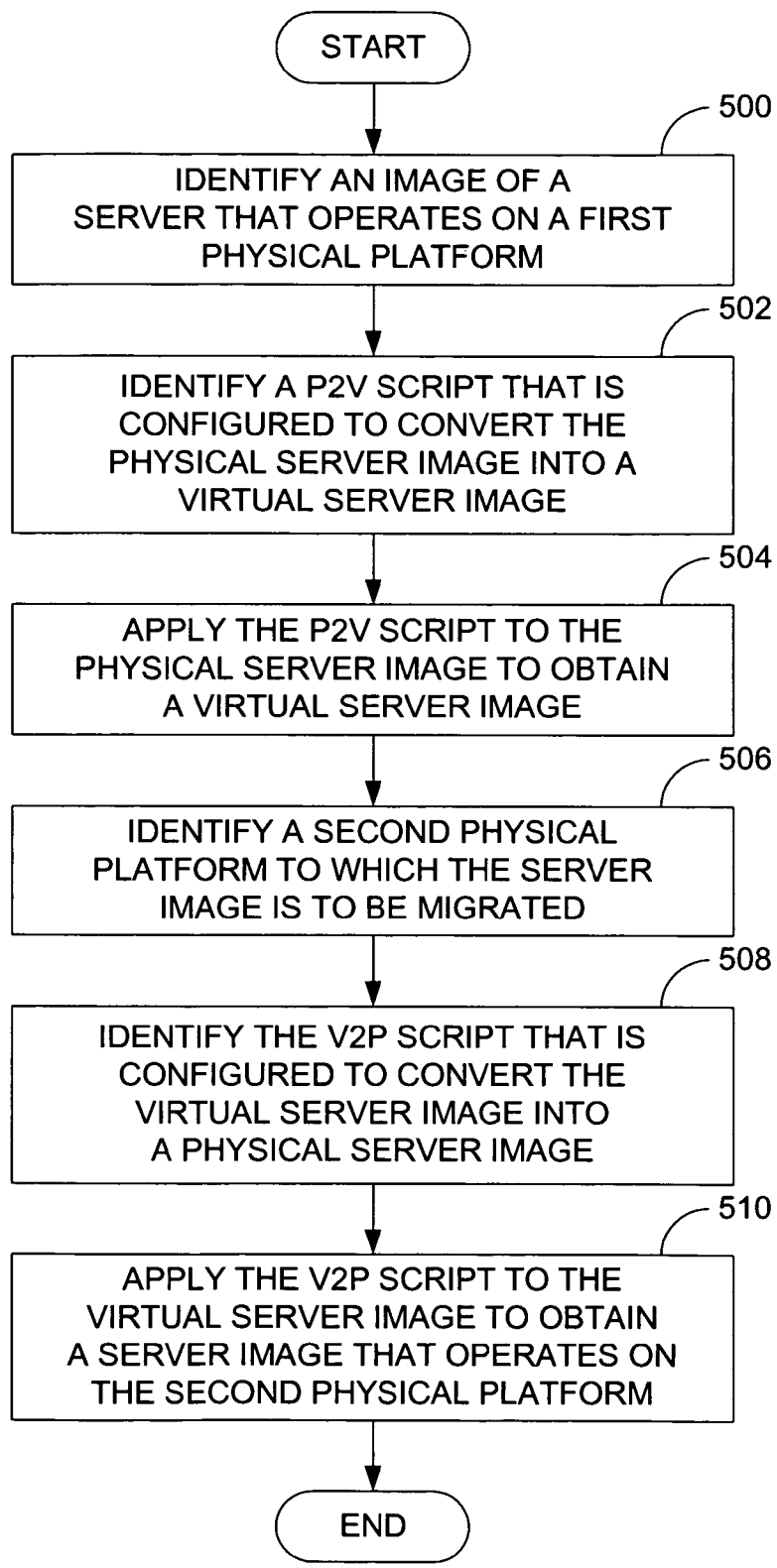
FIG. 5 is a flow diagram that illustrates an embodiment of converting a server image used on a first physical platform into a server image for use on a second physical platform.

Once the catalog is complete, the P2P migration for a given server application can be achieved by applying the appropriate scripts from the catalog to the source server (i.e., source server image). Such a process is at least partially automated, thereby simplifying the migration processes for the system administrator. FIG. 5 provides an example of converting a server image used on a first physical platform to a server image for use on a second physical platform using the conversion scripts.

Beginning with block 500, the platform migration manager 212 identifies an image of a server that operates on a first physical platform. That identification can be made, for instance, in response to an input from the system administrator who designated the source physical platform, as well as a target physical platform. As indicated in block 502, the manager 212 then identifies a P2V script (e.g., from the script library) that is configured to convert the physical server image into a virtual server image.

Next, the platform migration manager 212 applies the identified P2V script to the physical server image to obtain a virtual server image, as indicated in block 504. In similar manner to the P2V migration process performed by the P2V migration tools, application of the P2V script creates a virtual server that operates in similar manner to its hardware-based counterpart, but in a virtual environment.

With reference to block 506, the manager 212 next identifies the second physical platform to which the server image (both the source server image and the virtual server image) is to be migrated. Again, this identification can be made in response to a designation input by a system administrator. The manager 212 then identifies the V2P script that is configured to convert the virtual server into a physical server image, as indicated in block 508. Again, that script may be contained within the script library.

Finally, the platform migration manager 212 applies the V2P script to the virtual server image to obtain a server image that operates on the second physical platform, as indicated in block 510. A server image results that can be deployed on the second physical platform to complete the P2P migration process.

In the above-described migration process, the conversions from physical-to-virtual and virtual-to-physical are described as comprising two separate steps using two separate conversion scripts. The two steps can be combined, however, if desired, so as to provide more direct migration. In some embodiments, the P2V and V2P can be combined to form a P2P script that is configured to perform the full migration form physical-to-virtual and virtual-to-physical.

Figure 6:
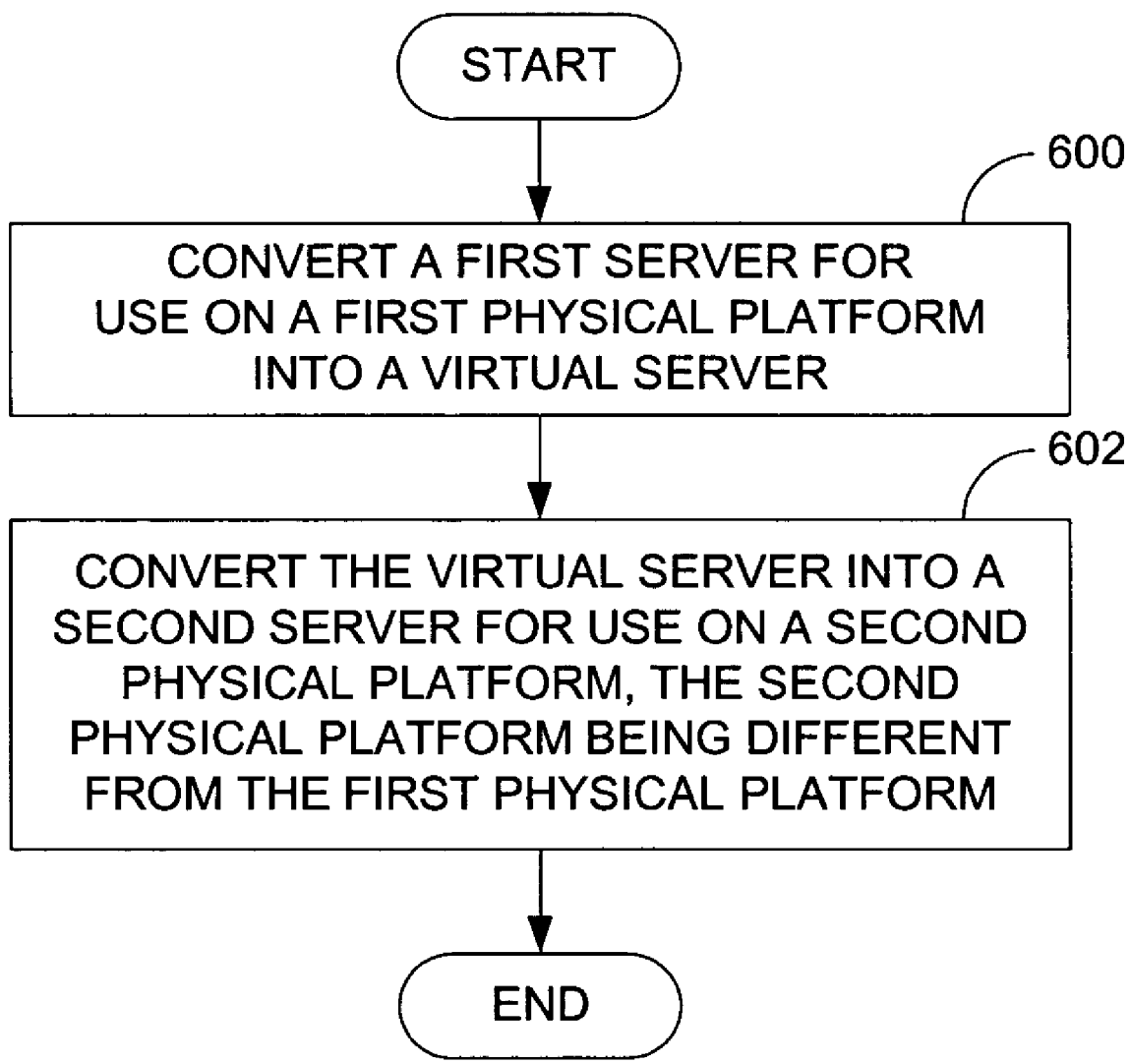
FIG. 6 is a flow diagram that illustrates an embodiment of a method for migrating a server from one physical platform to a different physical platform.

In view of the foregoing, a method for migrating a server may be described as illustrated in FIG. 6. As is shown in that figure, the method comprises converting a first server for use on a first physical platform into a virtual server (block 600), and converting the virtual server into a second server for use on a second physical platform (block 602), the second physical platform being different than the first physical platform such that the conversions effectively migrate the first server from the first physical platform to the second physical platform.

What is claimed is:

1. A method for migrating a server from one physical platform to another, the method comprising:
   converting a first server image configured for execution on a first physical platform into a first virtual server image;
   comparing the first server image with the first virtual server image to identify differences between the first server image and the first virtual server image;
   creating physical-to-virtual conversion scripts that are configured to effect changes in the first server image that result in the identified differences between the first server image and the first virtual server image, wherein the physical-to-virtual conversion scripts comprise commands used to convert physical servers into virtual servers;
   converting a second server image configured for execution on a second physical platform into a second virtual server image;
   comparing the second server image with the second virtual server image to identify differences between the second server image and the second virtual server image;
   creating virtual-to-physical conversion scripts that are configured to effect changes in the second virtual server image that result in the identified differences between the second virtual server image and the second server image, wherein the virtual-to-physical conversion scripts comprise commands used to convert virtual servers into physical servers;
   storing the physical-to-virtual conversion scripts and the virtual-to-physical conversion scripts in a script library;
   converting a third server image configured for execution on the first physical platform into a server image configured for execution on the second physical platform by first applying the physical-to-virtual conversion scripts stored in the script library to transform the third server image into a third virtual server image and then applying the virtual-to-physical conversion scripts stored in the script library to transform the third virtual server image into a server image configured for execution on the second physical platform, such that the third server image is migrated from the first physical platform to the second physical platform.

2. A server migration system stored on a computer-readable medium, the system comprising:

memory including logic configured to convert physical server images into corresponding virtual server images;

logic, including a comparator, configured to compare the physical server images with their corresponding virtual server images;

logic configured to identify differences between the physical server images and their corresponding virtual server images;

logic configured to generate physical-to-virtual conversion scripts that effect changes in the physical server images that result in the identified differences, wherein the physical-to-virtual conversion scripts comprise commands used to convert physical servers into virtual servers;

logic configured to generate virtual-to-physical conversion scripts that effect changes in the virtual server images that result in the identified differences, wherein the virtual-to-physical conversion scripts comprise commands used to convert virtual servers into physical servers;

logic configured to store the physical-to-virtual conversion scripts and the virtual-to-physical conversion scripts in a script library for later use in migrating servers from one physical platform to another;

logic configured to apply the physical-to-virtual conversion scripts stored in the script library to a first server configured for use on a first physical platform to transform the first server into a virtual server; and logic configured to apply the virtual-to-physical conversion scripts stored in the script library to the virtual server to transform the virtual server into a second server for use on a second physical platform, the second physical platform being different from the first physical platform.

3. A computer, comprising:

a processing device; and memory that includes a platform migration manager, the platform migration manager being configured to compare and identify differences between physical server images and corresponding virtual server images; to generate conversion scripts in view of the identified differences wherein the conversion scripts are used to transform virtual server images into physical server images and transform physical server images into virtual images; to store the conversion scripts in a script library; and to migrate servers from a first physical platform to a second physical platform by first transforming the servers into virtual servers and then transforming the virtual servers into servers configured for execution on the second physical platform through application of the generated conversion scripts stored in the script library.

4. The computer of claim 3, wherein the conversion scripts include separate physical-to-virtual (P2V) scripts and virtual-to-physical (V2P) scripts.

5. The computer of claim 4, wherein the platform migration manager includes a script library that comprises a physical-to-virtual (P2V) script and virtual-to-physical (V2P) script for each of multiple physical platforms.

6. The computer of claim 3, wherein the platform migration manager includes a physical-to-virtual (P2V) migration tool that is configured to migrate servers from physical platforms to virtual platforms.

7. The method of claim 1, wherein converting a first server image and converting a second server image comprises converting the server images using a physical-to-virtual migration tool.

8. The method of claim 1, wherein comparing is performed by a server image comparator.

9. A method for migrating a server from one physical platform to another, the method comprising:

applying physical-to-virtual scripts to a server image configured to execute on a first physical platform to transform the server image into a virtual server image, wherein the physical-to-virtual conversion scripts are stored in a script library comprise commands used to convert physical servers into virtual servers; and applying virtual-to-physical conversion scripts to the virtual server image to transform the virtual server image into a server image configured to execute on the second physical platform, such that the server is migrated from the first physical platform to the second physical platform, wherein the virtual-to-physical conversion scripts are stored in the script library and comprise commands used to convert virtual servers into physical servers.

10. The method of claim 9, further comprising generating the physical-to-virtual scripts by:

converting a first server image configured for execution on the first physical platform into a first virtual server image, comparing the first server image with the first virtual server image to identify differences between the first server image and the first virtual server image, and creating physical-to-virtual conversion scripts that are configured to effect a change in the first server image that results in a difference between the first server image and the first virtual server image.

11. The method of claim 10, further comprising generating the virtual-to-physical scripts by:

converting a second server image configured for execution on a second physical platform into a second virtual server image, comparing the second server image with the second virtual server image to identify differences between the second server image and the second virtual server image, and creating virtual-to-physical conversion scripts that are configured to effect a change in the second virtual server image that results in a difference between the second virtual server image and the second server image.

* * * * *